US010098177B2

(12) United States Patent
Liu et al.

(10) Patent No.: US 10,098,177 B2
(45) Date of Patent: Oct. 9, 2018

(54) DATA TRANSMISSION METHOD AND TERMINAL

(71) Applicant: HUAWEI TECHNOLOGIES CO., LTD., Shenzhen (CN)

(72) Inventors: Yalin Liu, Chengdu (CN); Yong Xie, Chengdu (CN); Jun Chen, Beijing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 15/472,895

(22) Filed: Mar. 29, 2017

(65) Prior Publication Data
US 2017/0202056 A1    Jul. 13, 2017

Related U.S. Application Data

(63) Continuation of application No. PCT/CN2014/087990, filed on Sep. 30, 2014.

(51) Int. Cl.
H04W 76/28    (2018.01)
H04W 4/12    (2009.01)
(Continued)

(52) U.S. Cl.
CPC .......... *H04W 76/28* (2018.02); *H04L 43/16* (2013.01); *H04W 76/048* (2013.01)

(58) Field of Classification Search
CPC . H04W 76/045; H04W 76/048; H04W 76/04; H04W 52/02; H04L 67/145; H04L 43/16; H04L 12/26
See application file for complete search history.

(56) References Cited

U.S. PATENT DOCUMENTS 8,554,860 B1    10/2013    Cook et al.
9,008,023 B2 *    4/2015    Khay-Ibbat ........... H04W 76/27
370/329
(Continued)

FOREIGN PATENT DOCUMENTS

CN    101594666 A    12/2009
CN    103428677 A    12/2013
(Continued)

OTHER PUBLICATIONS

Yunbin Luo, et al., "Technical Test and Analysis on the Influence of WeChat," Research and Development, 2013.
(Continued)

Primary Examiner — Khawar Iqbal
(74) Attorney, Agent, or Firm — Staas & Halsey LLP

(57) ABSTRACT

Embodiments of the present invention disclose a data transmission method and a terminal. The method includes: detecting, by a terminal in an idle state, whether a logical channel of a first path includes first to-be-transmitted data, and whether a logical channel of a second path includes second to-be-transmitted data; and if it is detected that the logical channel of the first path does not include the first to-be-transmitted data and a length of the second to-be-transmitted data is less than a preset second path transmission data threshold, selecting the second path to transmit the second to-be-transmitted data, where the second to-be-transmitted data includes discontinuously transmitted application data whose length is less than a preset threshold.

18 Claims, 4 Drawing Sheets

(51) Int. Cl.
*H04W 76/04* (2009.01)
*H04L 12/26* (2006.01)

(56) References Cited

U.S. PATENT DOCUMENTS

| | | | | |
|---|---|---|---|---|
| 9,462,591 | B2* | 10/2016 | Zakrzewski | ...... H04W 28/0215 |
| 9,681,354 | B2* | 6/2017 | Bangolae | ................ H04W 4/70 |
| 9,900,772 | B2* | 2/2018 | Vannithamby | ........ H04W 76/10 |
| 2009/0099175 | A1 | 4/2009 | Arrington et al. | |
| 2012/0195216 | A1* | 8/2012 | Wu | ................... H04W 72/0486 |
| | | | | 370/252 |
| 2012/0269147 | A1* | 10/2012 | He | ..................... H04W 72/0406 |
| | | | | 370/329 |
| 2013/0017779 | A1* | 1/2013 | Song | .................... H04W 76/005 |
| | | | | 455/39 |
| 2013/0114456 | A1 | 5/2013 | Dural et al. | |
| 2013/0170444 | A1* | 7/2013 | Pani | ................. H04W 72/0413 |
| | | | | 370/329 |
| 2013/0315288 | A1* | 11/2013 | Weng | ................... H04W 24/02 |
| | | | | 375/227 |
| 2015/0341823 | A1* | 11/2015 | Kanamarlapudi | ........................... |
| | | | | H04W 28/0252 |
| | | | | 370/230 |
| 2016/0029417 | A1* | 1/2016 | Vannithamby | .... H04W 52/0209 |
| | | | | 455/422.1 |
| 2016/0057753 | A1* | 2/2016 | Yang | ..................... H04L 5/0051 |
| | | | | 370/336 |
| 2016/0066195 | A1* | 3/2016 | Moon | ................... H04W 16/14 |
| | | | | 455/454 |
| 2016/0192258 | A1* | 6/2016 | Ciullo | ............... H04W 52/0258 |
| | | | | 370/331 |

FOREIGN PATENT DOCUMENTS

| | | |
|---|---|---|
| CN | 103650623 A | 3/2014 |
| CN | 104041162 A | 9/2014 |
| EP | 1414256 | 4/2004 |

OTHER PUBLICATIONS

International Search Report dated Jun. 30, 2015 in corresponding to International Application PCT/CN2014/087990.
International Search Report dated Jun. 30, 2015 in corresponding International Application No. PCT/CN2014/087990.
Extended European Search Report, dated Nov. 14, 2017, in European Application No. 14903061.1 (8 pp.).

* cited by examiner

DATA TRANSMISSION METHOD AND TERMINAL

CROSS-REFERENCE TO RELATED APPLICATIONS

This application is a continuation of International Application No. PCT/CN2014/087990, filed on Sep. 30, 2014, the disclosure of which is hereby incorporated by reference in its entirety.

TECHNICAL FIELD

The present disclosure relates to the data processing field, and in particular, to a data transmission method and a terminal.

BACKGROUND

With development of mobile Internet technologies, especially with emergence and popularization of intelligent terminals such as a mobile phone and a tablet computer, more users access a network by directly using these terminals. In addition, with rapid development of terminal operating systems and hardware performance, many pieces of software that are previously used on a computer can be used on an intelligent and miniaturized mobile terminal, and especially, social software is relatively frequently used. The software generally belongs to instant messaging software, and a connection to a network has characteristics of burstiness, timing, and the like. A type of instant messaging software is used as an example. The software sends one heartbeat packet every two minutes on an operating system of a terminal, so that the terminal periodically notifies a server of a status of the terminal. A network controller therefore needs to transmit dozens of pieces of network signaling, such as access signaling and bearer establishment signaling. After transmission is completed, the network controller releases air interface resources in 7-15 seconds. In one month, although a user who uses the instant messaging software does not perform any operation, 22320 heartbeat packets are sent. This is equivalent to consuming a signaling processing capability of sending 22320 SMS messages or is equivalent to a signaling processing capability of making more than ten thousand calls, but produces traffic of only 1.83 megabytes.

It can be learned that when the terminal uses the instant messaging software, a large amount of network signaling may be produced to maintain a connection to the server, and the produced network signaling is merely used for transmission of very few bytes. This signaling may cause interference to a normal service of the network. In addition, considering a future development prospect of the network, a large quantity of terminals may be connected to the network. Similar to sending an instant message, many terminals may intermittently send data with little content and a short length to the network, and sending frequency may be quite low. However, an increasing quantity of terminals may consume a large quantity of network signaling resources.

SUMMARY

Embodiments of the present invention provide a data transmission method and a terminal. In the method, a dedicated path may be selected to transmit discontinuously transmitted application data whose length is less than a preset threshold.

According to a first aspect, an embodiment of the present invention provides a terminal, including:

a detection unit, configured to detect whether a logical channel of a first path includes first to-be-transmitted data, and whether a logical channel of a second path includes second to-be-transmitted data; and a first selection unit, configured to: if it is detected that the logical channel of the first path does not include the first to-be-transmitted data and a length of the second to-be-transmitted data is less than a preset second path transmission data threshold, select the second path to transmit the second to-be-transmitted data, where the second to-be-transmitted data includes discontinuously transmitted application data whose length is less than a preset threshold.

With reference to the first aspect, in a first possible implementation manner of the first aspect, the first selection unit includes:

a first selection module, configured to: if there is one second path and the length of the second to-be-transmitted data is less than the preset second path transmission data threshold, select the second path to transmit the second to-be-transmitted data.

With reference to the first aspect, in a second possible implementation manner of the first aspect, the first selection unit further includes:

a second selection module, configured to: if there are at least two second paths and a total length of the second to-be-transmitted data of each second path is less than the preset second path transmission data threshold, select the second paths to transmit the second to-be-transmitted data.

With reference to the first aspect, in a third possible implementation manner of the first aspect, the first selection unit further includes:

a third selection module, configured to: if there are at least two second paths and a total length of the second to-be-transmitted data of each second path is greater than or equal to the preset second path transmission data threshold, select the first path to transmit the second to-be-transmitted data.

With reference to the third possible implementation manner of the first aspect, in a fourth possible implementation manner of the first aspect, the terminal further includes:

the selection module maps the second to-be-transmitted data to the first path for transmission.

With reference to the first aspect, in a fifth possible implementation manner of the first aspect, the terminal further includes:

a second selection unit, configured to: if the logical channel of the first path includes the first to-be-transmitted data, select the first path to transmit the first to-be-transmitted data.

With reference to the second possible implementation manner of the first aspect, in a sixth possible implementation manner of the first aspect, the terminal further includes:

the selection module maps the second to-be-transmitted data of logical channels of the at least two second paths to a transmission channel of a same second path for transmission.

With reference to the first aspect, in a seventh possible implementation manner of the first aspect, the terminal further includes:

a feedback unit, configured to receive a transmission result fed back by a base station, and transmit, by using the second path, the transmission result that is fed back.

With reference to the first aspect, in an eighth possible implementation manner of the first aspect, the discontinuously transmitted application data whose length is less than the preset threshold includes discontinuously transmitted application signaling whose length is less than the preset threshold and/or a discontinuously transmitted group whose length is less than the preset threshold.

According to a second aspect, an embodiment of the present invention further provides a data transmission method, including:

detecting, by a terminal in an idle state, whether a logical channel of a first path includes first to-be-transmitted data, and whether a logical channel of a second path includes second to-be-transmitted data; and if it is detected that the logical channel of the first path does not include the first to-be-transmitted data and a length of the second to-be-transmitted data is less than a preset second path transmission data threshold, selecting the second path to transmit the second to-be-transmitted data, where the second to-be-transmitted data includes discontinuously transmitted application data whose length is less than a preset threshold.

With reference to the second aspect, in a first possible implementation manner of the second aspect, the method further includes:

if there is one second path and the length of the second to-be-transmitted data is less than the preset second path transmission data threshold, selecting the second path to transmit the second to-be-transmitted data.

With reference to the second aspect, in a second possible implementation manner of the second aspect, the method further includes:

if there are at least two second paths and a total length of the second to-be-transmitted data of each second path is less than the preset second path transmission data threshold, selecting the second paths to transmit the second to-be-transmitted data.

With reference to the second aspect, in a third possible implementation manner of the second aspect, the method further includes:

if there are at least two second paths and a total length of the second to-be-transmitted data of each second path is greater than or equal to the preset second path transmission data threshold, selecting the first path to transmit the second to-be-transmitted data.

With reference to the third possible implementation manner of the second aspect, in a fourth possible implementation manner of the second aspect, the method further includes:

mapping the second to-be-transmitted data to the first path for transmission.

With reference to the second aspect, in a fifth possible implementation manner of the second aspect, the method further includes:

if the logical channel of the first path includes the first to-be-transmitted data, selecting the first path to transmit the first to-be-transmitted data.

With reference to the second possible implementation manner of the second aspect, in a sixth possible implementation manner of the second aspect, the method further includes:

mapping the second to-be-transmitted data of logical channels of the at least two second paths to a transmission channel of a same second path for transmission.

With reference to the second aspect, in a seventh possible implementation manner of the second aspect, after the selecting the second path to transmit the second to-be-transmitted data, the method further includes:

receiving a transmission result fed back by a base station, and transmitting, by using the second path, the transmission result that is fed back.

With reference to the second aspect, in an eighth possible implementation manner of the second aspect, the discontinuously transmitted application data whose length is less than the preset threshold includes discontinuously transmitted application signaling whose length is less than the preset threshold and/or a discontinuously transmitted group whose length is less than the preset threshold.

According to the data transmission method in the embodiments of the present invention, a dedicated path may be selected to transmit discontinuously transmitted application data whose length is less than a preset threshold. In this method, network resources may be reduced and data transmission efficiency may be effectively improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
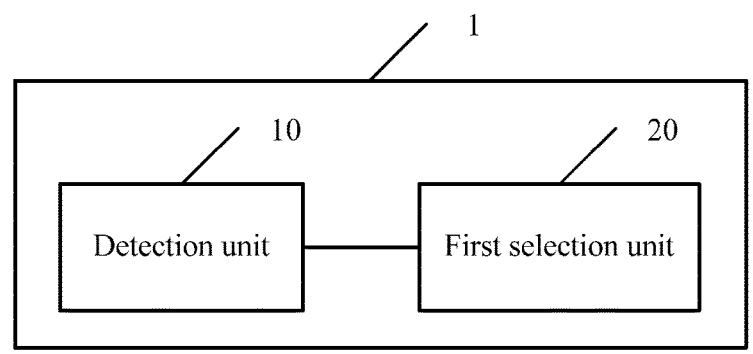
FIG. 1 is a schematic structural diagram of a terminal according to a first embodiment of the present invention.

Referring to FIG. 1, FIG. 1 is a schematic structural diagram of a terminal according to a first embodiment of the present invention. In this embodiment of the present invention, a terminal 1 receives a dedicated path resource (including a time domain resource, a link resource, or the like) allocated by a base station, and establishes a dedicated path connection to the base station. The terminal 1 in this embodiment of the present invention includes a detection unit 10 and a first selection unit 20.

The detection unit 10 is configured to detect whether a logical channel of a first path includes first to-be-transmitted data, and whether a logical channel of a second path includes second to-be-transmitted data.

Specifically, in this embodiment of the present invention, the second to-be-transmitted data includes discontinuously transmitted application data whose length is less than a preset threshold, the discontinuously transmitted application data whose length is less than the preset threshold includes discontinuously transmitted application signaling whose length is less than the preset threshold and/or a discontinuously transmitted group whose length is less than the preset threshold, and the first to-be-transmitted data includes a large amount of continuously transmitted data.

It should be known that the second path is a concept of a network scope, is not limited to an air interface, further includes a network side, and is an end-to-end concept, that is, the second path includes an air interface wireless path and a network transmission path. In addition, there may be one or more second paths for each base station. When there are multiple second paths, the multiple second paths may be classified according to applications. One application may have one second path, or multiple applications may share one second path. In terms of air interface physical resource allocation, resources of a same path may be continuous, or may be discrete, and are distributed on different time-frequency resource blocks. The second path transmits only user data in an idle state, and it needs to be determined whether to use the second path for transmission. When a terminal is in an idle state, the large amount of continuously transmitted data (the first to-be-transmitted data) may need to be sent, or only the discontinuously transmitted application data whose length is less than the preset threshold (the second to-be-transmitted data) may need to be sent. When the first to-be-transmitted data needs to be transmitted, the first path should be used for transmission, and when the second to-be-transmitted data needs to be transmitted, the second path may be used for transmission.

Certainly, if the logical channel of the first path includes the first to-be-transmitted data, the first path is selected to transmit the first to-be-transmitted data.

It should be understood that in this embodiment of the present invention, the terminal is configured to receive a dedicated path resource (including a time domain resource, a link resource, or the like) allocated by the base station, and establish a second path connection to the base station.

The first selection unit 20 is configured to: if it is detected that the logical channel of the first path does not include the first to-be-transmitted data and a length of the second to-be-transmitted data is less than a preset second path transmission data threshold, select the second path to transmit the second to-be-transmitted data.

Specifically, that the logical channel of the first path does not include the first to-be-transmitted data is that the terminal 1 is in the idle state (idle state).

If there is one second path and the length of the second to-be-transmitted data is less than the preset second path transmission data threshold, the second path is selected to transmit the second to-be-transmitted data.

If there are at least two second paths and a total length of the second to-be-transmitted data of each second path is less than the preset second path transmission data threshold, the second paths are selected to transmit the second to-be-transmitted data. It should be understood that the second to-be-transmitted data of logical channels of the at least two second paths may be mapped to a transmission channel of a same second path for transmission. The preset threshold may be defined by a protocol, or may be a changeable value defined for each second path, that is, preset thresholds of the second paths may be different.

It should be known that if there are at least two second paths and a total length of the second to-be-transmitted data of each second path is greater than or equal to the preset second path transmission data threshold, the first path is selected to transmit the second to-be-transmitted data. The second to-be-transmitted data may be mapped to the first path for transmission.

It should be understood that after the second path is selected to transmit the second to-be-transmitted data, the terminal further includes: a feedback unit receives a transmission result fed back by the base station, and transmits, by using the second path, the transmission result that is fed back. In another implementation manner of this embodiment of the present invention, if a user receives NACK feedback, a system performs automatic retransmission for a specific quantity of times N, for example, N is 4. Certainly, the system may not perform any feedback, and automatic retransmission is performed at an application layer. This depends on system design. If retransmission is performed at the application layer, feedback and retransmission do not need to be performed at a bottom layer.

In this embodiment of the present invention, the terminal may select a dedicated path to transmit the discontinuously transmitted application data whose length is less than the preset threshold. In this method, network resources may be reduced and data transmission efficiency may be effectively improved.

Figure 2:
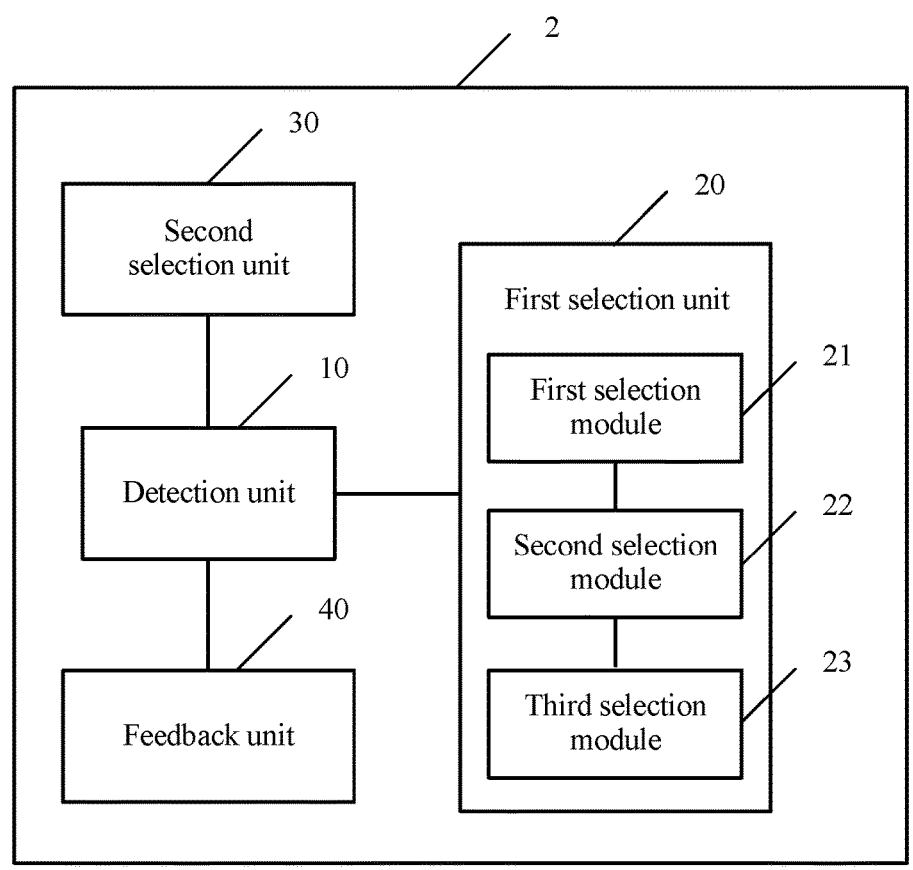
FIG. 2 is a schematic structural diagram of a terminal according to a second embodiment of the present invention.

Referring to FIG. 2, FIG. 2 is a schematic structural diagram of a terminal according to a second embodiment of the present invention. A terminal 2 shown in FIG. 2 is obtained by optimizing the terminal 1 shown in FIG. 1. In an apparatus shown in FIG. 2, in addition to the units included in the terminal shown in FIG. 1, a first selection unit 20 includes a first selection module 21, a second selection module 22, and a third selection module 23, and the terminal 2 further includes a second selection unit 30 and a feedback unit 40.

The first selection module 21 is configured to: if there is one second path and a length of second to-be-transmitted data is less than a preset threshold of second path transmission data, select the second path to transmit the second to-be-transmitted data.

The second selection module 22 is configured to: if there are at least two second paths and a total length of the second to-be-transmitted data of each second path is less than the preset second path transmission data threshold, select the second paths to transmit the second to-be-transmitted data.

The second selection unit 30 is configured to: if a logical channel of a first path includes first to-be-transmitted data, select the first path to transmit the first to-be-transmitted data.

Specifically, second to-be-transmitted data of logical channels of the at least two second paths may be mapped to a transmission channel of a same second path for transmission. The preset threshold may be defined by a protocol, or may be a changeable value defined for each second path, that is, preset thresholds of the second paths may be different.

It should be known that if there are at least two second paths and a total length of the second to-be-transmitted data of each second path is greater than or equal to the preset second path transmission data threshold, the first path is selected to transmit the second to-be-transmitted data. The second to-be-transmitted data may be mapped to the first path for transmission.

If data of the logical channel of each second path is transmitted by using the second path, a process from the logical channel to a physical channel is independent, and mapping from each logical path to a transmission path and mapping from the transmission path to the physical path are both independent. If the data of the logical channel of the second path is transmitted by using the first path, transmission is performed by using a shared channel of the transmission channel and a physical shared channel. In this case, a data transmission manner is the same as a conventional data transmission manner, and is a multiplexing transmission manner.

When the terminal determines to use the second path for transmission, the transmission manner may be a contention manner, including carrier sensing/conflict detection, code division multiplexing, or another manner. These manners can be defined by a protocol.

When users in a cell share the second path, it needs to be determined how to divide a resource and how the terminal selects one block from a second path resource for transmission. For example, in an LTE system, a PRB of a normal cyclic prefix (CP) includes twelve subcarriers and seven symbols. When the system allocates a resource to the second path, multiple physical resource blocks may be allocated. In this embodiment of the present invention, four PRBs may be allocated. If each second path needs two PRBs, two groups may be divided. It is assumed that a PRB 1 and a PRB 2 may be used by one user for transmission, and a PRB 3 and a PRB 4 may be used by another user for transmission. A resource block including the PRB 1 and the PRB 2 is a URB (user resource block). In an actual system, multiple URBs may be allocated to the second path simultaneously. When selecting an uplink transmission resource, the user needs to select, randomly or according to a specific preset rule, one resource block from the multiple URBs for transmission. A selection rule may be diverse, but the selection rule needs to ensure that selection results of various terminals are uniformly distributed without a conflict. Certainly, the selection herein includes not only allocation on a single subframe (or continuous subframes), but also allocation of a time domain, because the second path resource is periodically scheduled in the time domain.

The feedback unit 40 is configured to receive a transmission result fed back by a base station, and transmit, by using the second path, the transmission result that is fed back.

Specifically, after the second path is selected to transmit the second to-be-transmitted data, the terminal further includes: the feedback unit receives the transmission result fed back by the base station, and transmits, by using the second path, the transmission result that is fed back. In another implementation manner of this embodiment of the present invention, if the base station feeds back the transmission result, feedback needs to be performed on a downlink second path resource. If the system uses a contention manner that is similar to WiFi, a dedicated feedback resource is not required. In this case, the base station may select a resource block for feedback and transmission. When feedback and transmission are performed, an identifier that can identify the terminal needs to be included. If a frequency division duplex manner is used, a downlink resource block is selected for transmission. The terminal needs to continuously monitor the downlink resource block in a specific period of time to obtain feedback information. Feedback information of multiple users may be transmitted in a same URB. If a user receives NACK feedback, the system performs automatic retransmission for a specific quantity of times N, for example, N is 4. Certainly, the system may not perform any feedback, and automatic retransmission is performed at an application layer. This depends on system design. If retransmission is performed at the application layer, feedback and retransmission do not need to be performed at a bottom layer.

In this embodiment of the present invention, the terminal may select a dedicated path to transmit the discontinuously transmitted application data whose length is less than the preset threshold. In this method, network resources may be reduced and data transmission efficiency may be effectively improved.

Figure 3:
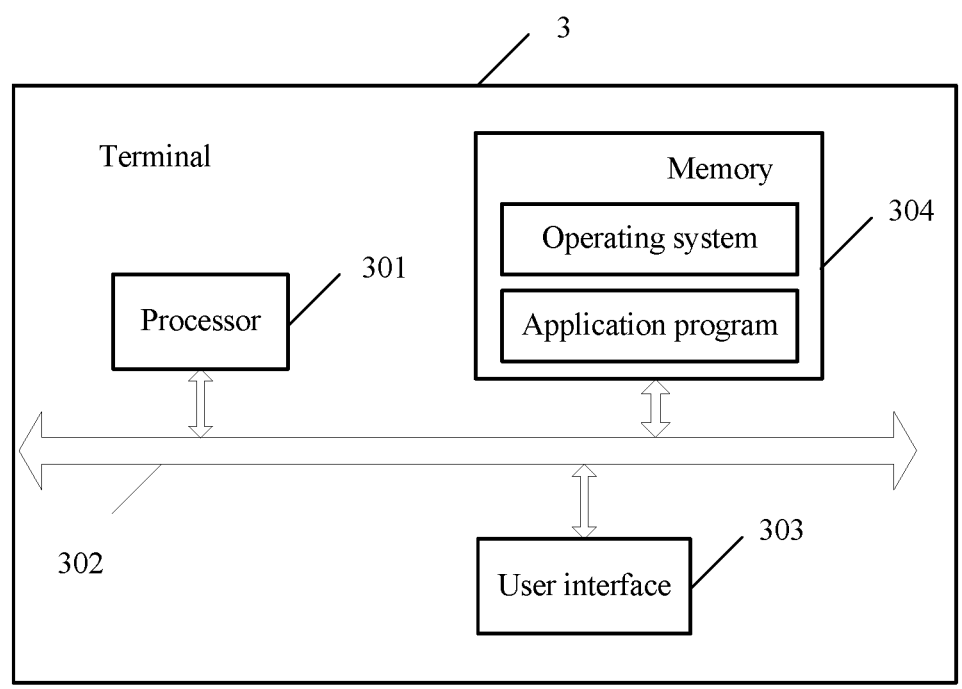
FIG. 3 is a schematic structural diagram of a terminal according to a third embodiment of the present invention.

Referring to FIG. 3, FIG. 3 is a schematic structural diagram of a terminal according to a third embodiment of the present invention. The terminal 3 includes: at least one processor 301, such as a CPU, a memory 304, at least one user interface 303, and at least one communications bus 302. The communications bus 302 is configured to implement connection and communication between these components. The user interface 303 may include a display (Display) or a keyboard (Keyboard). Optionally, the user interface 303 may further include a standard wired interface or a wireless interface. The memory 304 may be a high-speed RAM memory, or may be a non-volatile memory (non-volatile memory), such as at least one magnetic disk memory. Optionally, the memory 304 may be at least one storage apparatus located far away from the processor 301.

The processor 301 may be combined with a terminal described in FIG. 1 and FIG. 2. The memory 304 stores a set of program code, and the processor 301 invokes the program code stored in the memory 304 to perform the following operations:

detecting whether a logical channel of a first path includes first to-be-transmitted data, and whether a logical channel of a second path includes second to-be-transmitted data; and if it is detected that the logical channel of the first path does not include the first to-be-transmitted data and a length of the second to-be-transmitted data is less than a preset second path transmission data threshold, selecting the second path to transmit the second to-be-transmitted data, where the second to-be-transmitted data includes discontinuously transmitted application data whose length is less than a preset threshold, and the discontinuously transmitted application data whose length is less than the preset threshold includes discontinuously transmitted application signaling whose length is less than the preset threshold and/or a discontinuously transmitted group whose length is less than the preset threshold.

In an optional embodiment, the processor 301 may further invoke the program code stored in the memory 304 to perform the following operation:

if there is one second path and the length of the second to-be-transmitted data is less than the preset second path transmission data threshold, selecting the second path to transmit the second to-be-transmitted data.

In an optional embodiment, the processor 301 may further invoke the program code stored in the memory 304 to perform the following operation:

if there are at least two second paths and a total length of the second to-be-transmitted data of each second path is less than the preset second path transmission data threshold, selecting the second paths to transmit the second to-be-transmitted data.

In an optional embodiment, the processor 301 may further invoke the program code stored in the memory 304 to perform the following operation:

if there are at least two second paths and a total length of the second to-be-transmitted data of each second path is greater than or equal to the preset second path transmission data threshold, selecting the first path to transmit the second to-be-transmitted data.

In an optional embodiment, the processor 301 may further invoke the program code stored in the memory 304 to perform the following operation:

mapping the second to-be-transmitted data to the first path for transmission.

In an optional embodiment, the processor 301 may further invoke the program code stored in the memory 304 to perform the following operation:

if the logical channel of the first path includes the first to-be-transmitted data, selecting the first path to transmit the first to-be-transmitted data.

In an optional embodiment, the processor 301 may further invoke the program code stored in the memory 304 to perform the following operation:

mapping the second to-be-transmitted data of logical channels of the at least two second paths to a transmission channel of a same second path for transmission.

In an optional embodiment, the processor 301 may further invoke the program code stored in the memory 304 to perform the following operation:

receiving a transmission result fed back by a base station, and transmitting, by using the second path, the transmission result that is fed back.

Specifically, the terminal described in this embodiment may be configured to perform some or all processes of the terminal embodiment described with reference to FIG. 1 or FIG. 2 in the present invention. Details are not described herein again.

Figure 4:
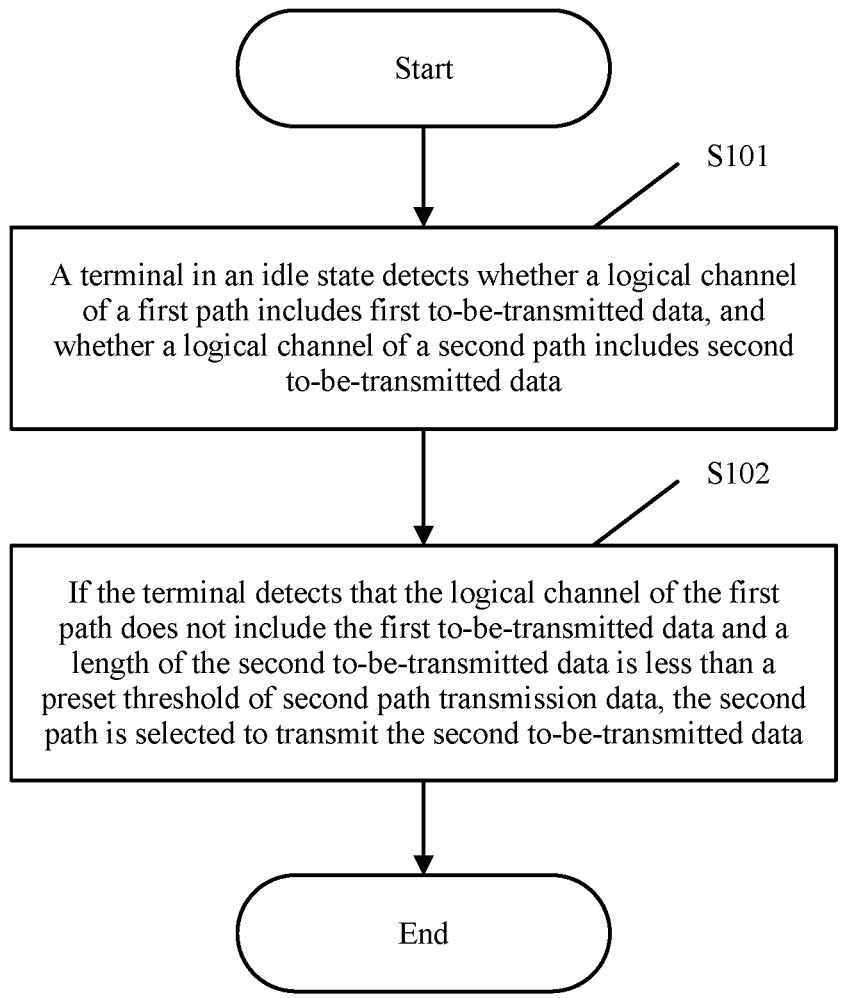
FIG. 4 is a schematic flowchart of a data transmission method according to a first embodiment of the present invention.

Referring to FIG. 4, FIG. 4 is a schematic flowchart of a data transmission method according to a first embodiment of the present invention. The method includes the following steps.

S101. A terminal in an idle state detects whether a logical channel of a first path includes first to-be-transmitted data, and whether a logical channel of a second path includes second to-be-transmitted data.

Specifically, in this embodiment of the present invention, the second to-be-transmitted data includes discontinuously transmitted application data whose length is less than a preset threshold, the discontinuously transmitted application data whose length is less than the preset threshold includes discontinuously transmitted application signaling whose length is less than the preset threshold and/or a discontinuously transmitted group whose length is less than the preset threshold, and the first to-be-transmitted data includes a large amount of continuously transmitted data.

It should be known that the second path is a concept of a network scope, is not limited to an air interface, further includes a network side, and is an end-to-end concept, that is, the second path includes an air interface wireless path and a network transmission path. In addition, there may be one or more second paths for each base station. When there are multiple second paths, the multiple second paths may be classified according to applications. One application may have one second path, or multiple applications may share one second path. In terms of air interface physical resource allocation, resources of a same path may be continuous, or may be discrete, and are distributed on different time-frequency resource blocks. The second path transmits only user data in an idle state, and it needs to be determined whether to use the second path for transmission. When a terminal is in an idle state, the large amount of continuously transmitted data (the first to-be-transmitted data) may need to be sent, or only the discontinuously transmitted application data whose length is less than the preset threshold (the second to-be-transmitted data) may need to be sent. When the first to-be-transmitted data needs to be transmitted, the first path should be used for transmission, and when the second to-be-transmitted data needs to be transmitted, the second path may be used for transmission.

Certainly, if the logical channel of the first path includes the first to-be-transmitted data, the first path is selected to transmit the first to-be-transmitted data.

It should be understood that in this embodiment of the present invention, the terminal is configured to receive a dedicated path resource (including a time domain resource, a link resource, or the like) allocated by the base station, and establish a second path connection to the base station.

S102. If the terminal detects that the logical channel of the first path does not include the first to-be-transmitted data and a length of the second to-be-transmitted data is less than a preset second path transmission data threshold, the second path is selected to transmit the second to-be-transmitted data.

Specifically, if there is one second path and the length of the second to-be-transmitted data is less than the preset second path transmission data threshold, the second path is selected to transmit the second to-be-transmitted data.

If there are at least two second paths and a total length of the second to-be-transmitted data of each second path is less than the preset second path transmission data threshold, the second paths are selected to transmit the second to-be-transmitted data. The second to-be-transmitted data of logical channels of the at least two second paths may be mapped to a transmission channel of a same second path for transmission. The preset threshold may be defined by a protocol, or may be a changeable value defined for each second path, that is, preset thresholds of the second paths may be different.

It should be known that if there are at least two second paths and a total length of the second to-be-transmitted data of each second path is greater than or equal to the preset second path transmission data threshold, the first path is selected to transmit the second to-be-transmitted data. The second to-be-transmitted data may be mapped to the first path for transmission.

It should be understood that after the second path is selected to transmit the second to-be-transmitted data, the method further includes: receiving a transmission result fed back by the base station, and transmitting, by using the second path, the transmission result that is fed back. In another implementation manner of this embodiment of the present invention, if a user receives NACK feedback, a system performs automatic retransmission for a specific quantity of times N, for example, N is 4. Certainly, the system may not perform any feedback, and automatic retransmission is performed at an application layer. This depends on system design. If retransmission is performed at the application layer, feedback and retransmission do not need to be performed at a bottom layer.

According to the data transmission method in this embodiment of the present invention, a dedicated path may be selected to transmit the discontinuously transmitted application data whose length is less than the preset threshold. In this method, network resources may be reduced and data transmission efficiency may be effectively improved.

Figure 5:
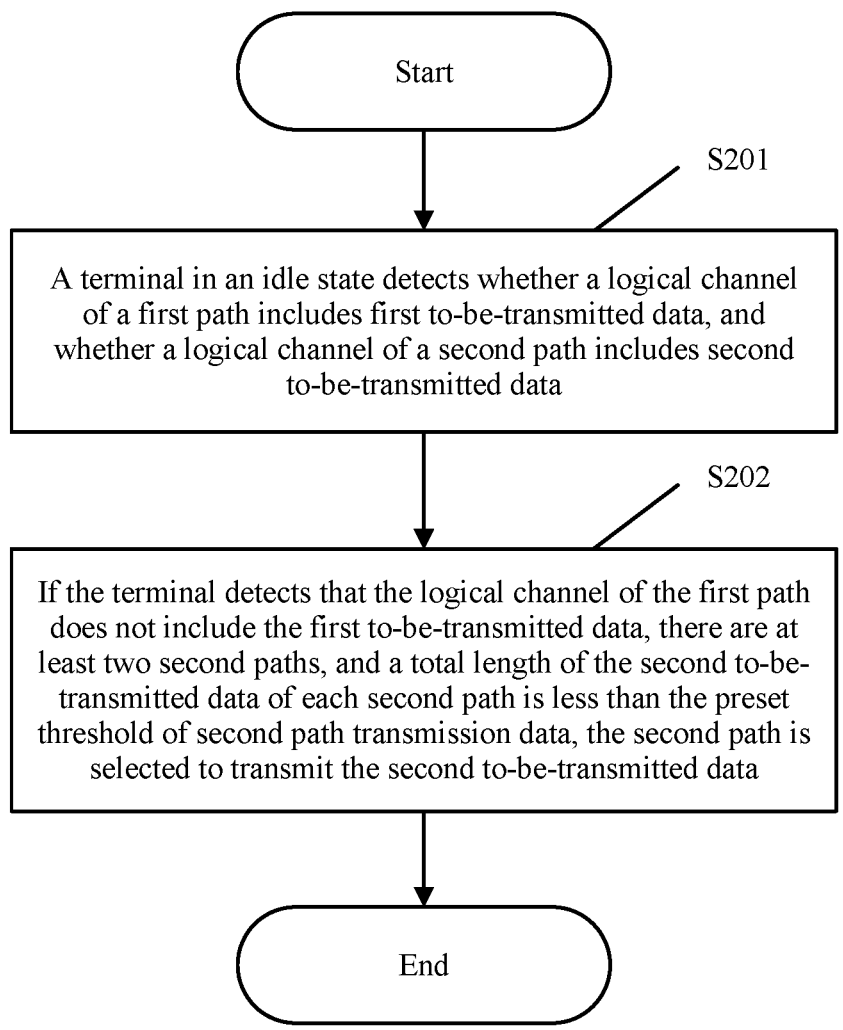
FIG. 5 is a schematic flowchart of a data transmission method according to a second embodiment of the present invention.

Referring to FIG. 5, FIG. 5 is a schematic flowchart of a data transmission method according to a second embodiment of the present invention. The method includes the following steps.

S201. A terminal in an idle state detects whether a logical channel of a first path includes first to-be-transmitted data, and whether a logical channel of a second path includes second to-be-transmitted data.

Specifically, in this embodiment of the present invention, the second to-be-transmitted data includes discontinuously transmitted application data whose length is less than a preset threshold, the discontinuously transmitted application data whose length is less than the preset threshold includes discontinuously transmitted application signaling whose length is less than the preset threshold and/or a discontinuously transmitted group whose length is less than the preset threshold, and the first to-be-transmitted data includes a large amount of continuously transmitted data.

It should be known that the second path is a concept of a network scope, is not limited to an air interface, further includes a network side, and is an end-to-end concept, that is, the second path includes an air interface wireless path and a network transmission path. In addition, there may be one or more second paths for each base station. When there are multiple second paths, the multiple second paths may be classified according to applications. One application may have one second path, or multiple applications may share one second path. In terms of air interface physical resource allocation, resources of a same path may be continuous, or may be discrete, and are distributed on different time-frequency resource blocks. The second path transmits only user data in an idle state, and it needs to be determined whether to use the second path for transmission. When a terminal is in an idle state, the large amount of continuously transmitted data (the first to-be-transmitted data) may need to be sent, or only the discontinuously transmitted application data whose length is less than the preset threshold (the second to-be-transmitted data) may need to be sent. When the first to-be-transmitted data needs to be transmitted, the first path should be used for transmission, and when the second to-be-transmitted data needs to be transmitted, the second path may be used for transmission.

Certainly, if the logical channel of the first path includes the first to-be-transmitted data, the first path is selected to transmit the first to-be-transmitted data.

It should be understood that in this embodiment of the present invention, the terminal is configured to receive a dedicated path resource (including a time domain resource, a link resource, or the like) allocated by the base station, and establish a second path connection to the base station.

S202. If the terminal detects that the logical channel of the first path does not include the first to-be-transmitted data, there are at least two second paths, and a total length of the second to-be-transmitted data of each second path is less than the preset second path transmission data threshold, the second path is selected to transmit the second to-be-transmitted data.

Specifically, second to-be-transmitted data of logical channels of the at least two second paths may be mapped to a transmission channel of a same second path for transmission. The preset threshold may be defined by a protocol, or may be a changeable value defined for each second path.

It should be known that if there are at least two second paths and a total length of the second to-be-transmitted data of each second path is greater than or equal to the preset second path transmission data threshold, the first path is selected to transmit the second to-be-transmitted data. The second to-be-transmitted data may be mapped to the first path for transmission.

If data of the logical channel of each second path is transmitted by using the second path, a process from the logical channel to a physical channel is independent, and mapping from each logical path to a transmission path and mapping from the transmission path to the physical path are both independent. If the data of the logical channel of the second path is transmitted by using the first path, transmission is performed by using a shared channel of the transmission channel and a physical shared channel. In this case, a data transmission manner is the same as a conventional data transmission manner, and is a multiplexing transmission manner.

When the terminal determines to use the second path for transmission, the transmission manner may be a contention manner, including carrier sensing/conflict detection, code division multiplexing, or another manner. These manners can be defined by a protocol.

When users in a cell share the second path, it needs to be determined how to divide a resource and how the terminal selects one block from a second path resource for transmission. For example, in an LTE system, a PRB of a normal cyclic prefix (CP) includes twelve subcarriers and seven symbols. When the system allocates a resource to the second path, multiple physical resource blocks may be allocated. In this embodiment of the present invention, four PRBs may be allocated. If each second path needs two PRBs, two groups may be divided. It is assumed that a PRB 1 and a PRB 2 may be used by one user for transmission, and a PRB 3 and a PRB 4 may be used by another user for transmission. A resource block including the PRB 1 and the PRB 2 is a URB (user resource block). In an actual system, multiple URBs may be allocated to the second path simultaneously. When selecting an uplink transmission resource, the user needs to select, randomly or according to a specific preset rule, one resource block from the multiple URBs for transmission. A selection rule may be diverse, but the selection rule needs to ensure that selection results of various terminals are uniformly distributed without a conflict. Certainly, the selection herein includes not only allocation on a single subframe (or continuous subframes), but also allocation of a time domain, because the second path resource is periodically scheduled in the time domain.

It should be understood that after the second path is selected to transmit the second to-be-transmitted data, the method further includes: receiving a transmission result fed back by the base station, and transmitting, by using the second path, the transmission result that is fed back. In another implementation manner of this embodiment of the present invention, if the base station feeds back the transmission result, feedback needs to be performed on a downlink second path resource. If the system uses a contention manner that is similar to WiFi, a dedicated feedback resource is not required. In this case, the base station may select a resource block for feedback and transmission. When feedback and transmission are performed, an identifier that can identify the terminal needs to be included. If a frequency division duplex manner is used, a downlink resource block is selected for transmission. The terminal needs to continuously monitor the downlink resource block in a specific period of time to obtain feedback information. Feedback information of multiple users may be transmitted in a same URB. If a user receives NACK feedback, the system performs automatic retransmission for a specific quantity of times N, for example, N is 4. Certainly, the system may not perform any feedback, and automatic retransmission is performed at an application layer. This depends on system design. If retransmission is performed at the application layer, feedback and retransmission do not need to be performed at a bottom layer.

According to the data transmission method in this embodiment of the present invention, a dedicated path may be selected to transmit the discontinuously transmitted application data whose length is less than the preset threshold. In this method, network resources may be reduced and data transmission efficiency may be effectively improved.

It should be understood that the first selection unit and the second selection unit do not represent a sequence relationship, but distinguish different selection units. Likewise, the first selection module and the second selection module represent different selection modules, and details are not described herein.

Persons of ordinary skill in the art may understand that, each aspect of the present invention or a possible implementation manner of each aspect may be specifically implemented as a system, a method, or a computer program product. In addition, each aspect of the present invention or the possible implementation manner of each aspect may take a form of a computer program product, where the computer program product refers to computer-readable program code stored in a computer-readable medium.

The computer-readable medium may be a computer-readable data medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a local computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A terminal, comprising:
a processor; and
a memory storing a plurality of computer executable instructions which, when executed by the processor, cause the terminal to
detect whether a logical channel of a first path comprises first to-be-transmitted data, and whether a logical channel of a second path comprises second to-be-transmitted data, wherein the first path is a path using a physical shared channel, the second path is a path using a dedicated resource allocated by a base station; and
when the terminal detects that the logical channel of the first path includes the first to-be-transmitted data, select the first path to transmit the first to-be-transmitted data and the second to-be-transmitted data;
when the terminal detects that the logical channel of the first path does not comprise the first to-be-transmitted data and a length of the second to-be-transmitted data is less than a preset second path transmission data threshold, select the second path to transmit the second to-be-transmitted data; and
when the terminal detects that the logical channel of the first path does not comprise the first to-be-transmitted data and a length of the second to-be-transmitted data is greater than or equal to the preset second path transmission data threshold, select the first path to transmit the second to-be-transmitted data,
wherein
the first to-be-transmitted data includes data which need to be continuously transmitted, and
the second to-be-transmitted data comprises discontinuously transmitted application data whose length is less than a preset threshold.

2. The terminal according to claim 1, wherein the memory stores further computer readable instructions which, when executed by the processor, further cause the terminal to: when there is one second path and the length of the second to-be-transmitted data is less than the preset second path transmission data threshold, select the second path to transmit the second to-be-transmitted data.

3. The terminal according to claim 1, wherein the memory stores further computer readable instructions which, when executed by the processor, further cause the terminal to: when there are at least two second paths and a total length of the second to-be-transmitted data of each second path is less than the preset second path transmission data threshold, select the second paths to transmit the second to-be-transmitted data.

4. The terminal according to claim 3, wherein the memory stores further computer readable instructions which, when executed by the processor, further cause the terminal to: map the second to-be-transmitted data of logical channels of the at least two second paths to a transmission channel of a same second path for transmission.

5. The terminal according to claim 1, wherein the memory stores further computer readable instructions which, when executed by the processor, further cause the terminal to:
when there are at least two second paths and a total length of the second to-be-transmitted data of each second path is greater than or equal to the preset second path transmission data threshold, select the first path to transmit the second to-be-transmitted data.

6. The terminal according to claim 5, wherein the memory stores further computer readable instructions which, when executed by the processor, further cause the terminal to: map the second to-be-transmitted data to the first path for transmission.

7. The terminal according to claim 1, wherein the memory stores further computer readable instructions which, when executed by the processor, further cause the terminal to: when the logical channel of the first path comprises the first to-be-transmitted data, select the first path to transmit the first to-be-transmitted data.

8. The terminal according to claim 1, wherein the memory stores further computer readable instructions which, when executed by the processor, further cause the terminal to: receive a transmission result fed back by a base station, and transmit, by using the second path, the transmission result that is fed back.

9. The terminal according to claim 1, wherein the discontinuously transmitted application data whose length is less than the preset threshold comprises discontinuously transmitted application signaling whose length is less than the preset threshold and/or a discontinuously transmitted group whose length is less than the preset threshold.

10. A data transmission method, comprising:
    detecting, by a terminal in an idle state, whether a logical channel of a first path comprises first to-be-transmitted data, and whether a logical channel of a second path comprises second to-be-transmitted data, wherein the first path is a path using physical shared channel, the second path is a path using dedicated resource allocated by a base station; and
    when it is detected that the logical channel of the first path includes the first to-be-transmitted data, select the first path to transmit the first to-be-transmitted data and the second to-be-transmitted data;
    when it is detected that the logical channel of the first path does not comprise the first to-be-transmitted data and a length of the second to-be-transmitted data is less than a preset second path transmission data threshold, selecting the second path to transmit the second to-be-transmitted data; and
    when it is detected that the logical channel of the first path does not comprise the first to-be-transmitted data and a length of the second to-be-transmitted data is greater than or equal to the preset second path transmission data threshold, select the first path to transmit the second to-be-transmitted data,
    wherein
    the first to-be-transmitted data includes data which need to be continuously transmitted, and the second to-be-transmitted data comprises discontinuously transmitted application data whose length is less than a preset threshold.

11. The method according to claim 10, further comprising:
    when there is one second path and the length of the second to-be-transmitted data is less than the preset second path transmission data threshold, selecting the second path to transmit the second to-be-transmitted data.

12. The method according to claim 10, further comprising:
    when there are at least two second paths and a total length of the second to-be-transmitted data of each second path is less than the preset second path transmission data threshold, selecting the second paths to transmit the second to-be-transmitted data.

13. The method according to claim 12, further comprising:
    mapping the second to-be-transmitted data of logical channels of the at least two second paths to a transmission channel of a same second path for transmission.

14. The method according to claim 10, further comprising:
    when there are at least two second paths and a total length of the second to-be-transmitted data of each second path is greater than or equal to the preset second path transmission data threshold, selecting the first path to transmit the second to-be-transmitted data.

15. The method according to claim 14, further comprising:
    mapping the second to-be-transmitted data to the first path for transmission.

16. The method according to claim 10, further comprising:
    when the logical channel of the first path comprises the first to-be-transmitted data, selecting the first path to transmit the first to-be-transmitted data.

17. The method according to claim 10, after the selecting the second path to transmit the second to-be-transmitted data, further comprising:
    receiving a transmission result fed back by a base station, and transmitting, by using the second path, the transmission result that is fed back.

18. The method according to claim 10, wherein the discontinuously transmitted application data whose length is less than the preset threshold comprises discontinuously transmitted application signaling whose length is less than the preset threshold and/or a discontinuously transmitted group whose length is less than the preset threshold.

* * * * *